United States Patent
Van Keulen

(10) Patent No.: US 10,413,924 B2
(45) Date of Patent: Sep. 17, 2019

(54) PROPORTIONING CYLINDER FOR SPRAY SYSTEM

(71) Applicant: Graco Minnesota Inc., Minneapolis, MN (US)

(72) Inventor: Dennis J. Van Keulen, Rogers, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 381 days.

(21) Appl. No.: 14/904,303

(22) PCT Filed: Jul. 18, 2014

(86) PCT No.: PCT/US2014/047206
§ 371 (c)(1),
(2) Date: Jan. 11, 2016

(87) PCT Pub. No.: WO2015/010028
PCT Pub. Date: Jan. 22, 2015

(65) Prior Publication Data
US 2016/0151798 A1 Jun. 2, 2016

(51) Int. Cl.
*B05B 11/00* (2006.01)
*B05B 15/55* (2018.01)
(Continued)

(52) U.S. Cl.
CPC ........ *B05B 11/3005* (2013.01); *B05B 9/0413* (2013.01); *B05B 12/1418* (2013.01);
(Continued)

(58) Field of Classification Search
CPC .... F04B 5/02; F04B 3/00; F04B 13/00; F04B 13/02; F04B 15/02; F04B 15/26;
(Continued)

(56) References Cited

U.S. PATENT DOCUMENTS 4,008,012 A * 2/1977 Page ................... F04B 3/00
417/435
4,278,205 A 7/1981 Binoche
(Continued)

FOREIGN PATENT DOCUMENTS

CN 1108880 C 5/2003
CN 102639873 A 8/2012
(Continued)

OTHER PUBLICATIONS

Office Action from Taiwan Patent Application No. 103125019, dated Dec. 26, 2017, 10 pages.
(Continued)

*Primary Examiner* — Kenneth J Hansen
(74) *Attorney, Agent, or Firm* — Kinney & Lange, P.A.

(57) ABSTRACT

A spray system has a pump with a double-action reciprocating plunger balanced to receive equal up-stroke and down-stroke assist from a pre-pressurized supply. The reciprocating plunger has identical working surface area on opposite first and second axial faces. A pumping system has a double-action reciprocating plunger with upward- and downward-facing spacers. The plunger travels axially within a proportioning cylinder with first inlet and outlet ports at a first axial end, and second inlet and outlet ports at an opposite second axial end. When the plunger is at its top-most position, the upward-facing plunger occludes the first inlet and outlet ports without blocking flow. When the plunger is at its bottom-most position, the downward-facing plunger occludes the second inlet and outlet ports without blocking flow.

10 Claims, 3 Drawing Sheets

(51) Int. Cl.
*B05B 9/04* (2006.01)
*B05B 12/14* (2006.01)
*F04B 5/02* (2006.01)
*F04B 13/00* (2006.01)
*F04B 15/02* (2006.01)
*F16N 7/32* (2006.01)
*B05B 7/04* (2006.01)
*B05B 7/24* (2006.01)

(52) U.S. Cl.
CPC .............. *B05B 15/55* (2018.02); *F04B 5/02* (2013.01); *F04B 13/00* (2013.01); *F04B 15/02* (2013.01); *F16N 7/32* (2013.01); *B05B 7/0408* (2013.01); *B05B 7/2486* (2013.01); *B05B 7/2497* (2013.01); *B05B 9/04* (2013.01); *F04B 2201/0601* (2013.01)

(58) Field of Classification Search
CPC .......... F04B 17/03; F04B 17/04; F04B 9/113; F04B 9/115; F04B 2015/026; F15B 15/1461; F15B 15/1452; B05B 9/0413; B05B 11/3001; B05B 11/3005
USPC ........ 92/167, 168; 222/320–321.9, 504, 282, 222/288, 309
See application file for complete search history.

(56) References Cited

U.S. PATENT DOCUMENTS

| | | | |
|---|---|---|---|
| 4,715,791 A * | 12/1987 | Berlin | F04B 49/12 417/274 |
| 4,946,352 A | 8/1990 | Evenson | |
| 5,605,446 A | 2/1997 | Handzel et al. | |
| 2004/0021008 A1 | 2/2004 | Fischer et al. | |
| 2005/0109798 A1 | 5/2005 | Kasting | |
| 2007/0095938 A1 | 5/2007 | Rioux | |
| 2013/0039778 A1 | 2/2013 | Blackson et al. | |

FOREIGN PATENT DOCUMENTS

| | | |
|---|---|---|
| GB | 1249992 | 10/1971 |
| GB | 1357961 | 6/1974 |
| JP | S63164972 U | 10/1988 |
| JP | 2003128170 A | 5/2003 |
| TW | TW290613 B | 11/1996 |
| WO | WO95/02750 A1 | 1/1995 |
| WO | WO98/02659 A1 | 1/1998 |

OTHER PUBLICATIONS

International Search Report and Written Opinion from PCT Application Serial No. PCT/US2014/047206, dated Nov. 6, 2014, 11 pages.
Chinese Office Action from Chinese Appln. No. 201480038385.9, dated Apr. 26, 2017, 13 pages.
Extended European Search Report for EP Application No. 14825699.3, dated May 23, 2017, 12 pages.
Japanese Notice of Reasons for Refusal from JP Application No. 2016-527130, dated Apr. 18, 2018, 6 pages.

\* cited by examiner

PROPORTIONING CYLINDER FOR SPRAY SYSTEM

BACKGROUND

The present invention relates generally to applicator systems that are used to spray fluids, such as paint, sealants, coatings, and the like. More particularly, the invention relates to a proportioning cylinder of a pumping subsystem of a spray system.

Some fluid applicators have separate "A-side" and "B-side" fluid systems (e.g. pumps, reservoirs, and fluid lines) that carry different fluids components. These components are isolated until sprayed or otherwise applied, whereupon the components mix and chemically interact to form an application material. Two-component fluid spray systems are commonly used to apply epoxies, foams, and two-component paints. Paint systems, for example, may combine A-side paints with B-side catalyst materials. Common catalyst materials include isocyanates, polyesters, epoxies, and acrylics. Different paints or other A-side materials may require different B-side catalysts.

A- and B-side fluid systems typically comprise separate fluid sources (e.g. reservoirs or lines) that are pumped via separate pumps to a common sprayer head actuated by a human operator or an automated machine process. Required spray pressures vary as a function of material and application, and desired flow rates of A- and B-side fluids often differ. Paints and catalysts intended to be combined in a 10-to-1 ratio, for instance, will necessitate A-side pump displacement ten times greater than B-side pump displacement.

Spray systems use a variety of different pumping mechanisms. Many spray systems utilize gear pumps for continuous pumping fluid flow. Wear over time can cause gear pumps to slip or grind.

SUMMARY

In a first embodiment, a spray system has a pump with a double-action reciprocating plunger balanced to receive equal up-stroke and down-stroke assist from a pre-pressurized supply. The reciprocating plunger has identical working surface area on opposite first and second axial faces.

In a second embodiment, a pumping system has a double-action reciprocating plunger with upward- and downward-facing spacers. The plunger travels axially within a proportioning cylinder with first inlet and outlet ports at a first axial end, and second inlet and outlet ports at an opposite second axial end. When the plunger is at its top-most position, the upward-facing plunger occludes the first inlet and outlet ports without blocking flow. When the plunger is at its bottom-most position, the downward-facing plunger occludes the second inlet and outlet ports without blocking flow.

DETAILED DESCRIPTION

The present invention relates to a multi-point lubrication subsystem for a pump of a two-component spray system such as a combined paint-catalyst sprayer. A single lubricant reservoir is connected via gravity feed lines to a plurality of pump seals.

Figure 1:
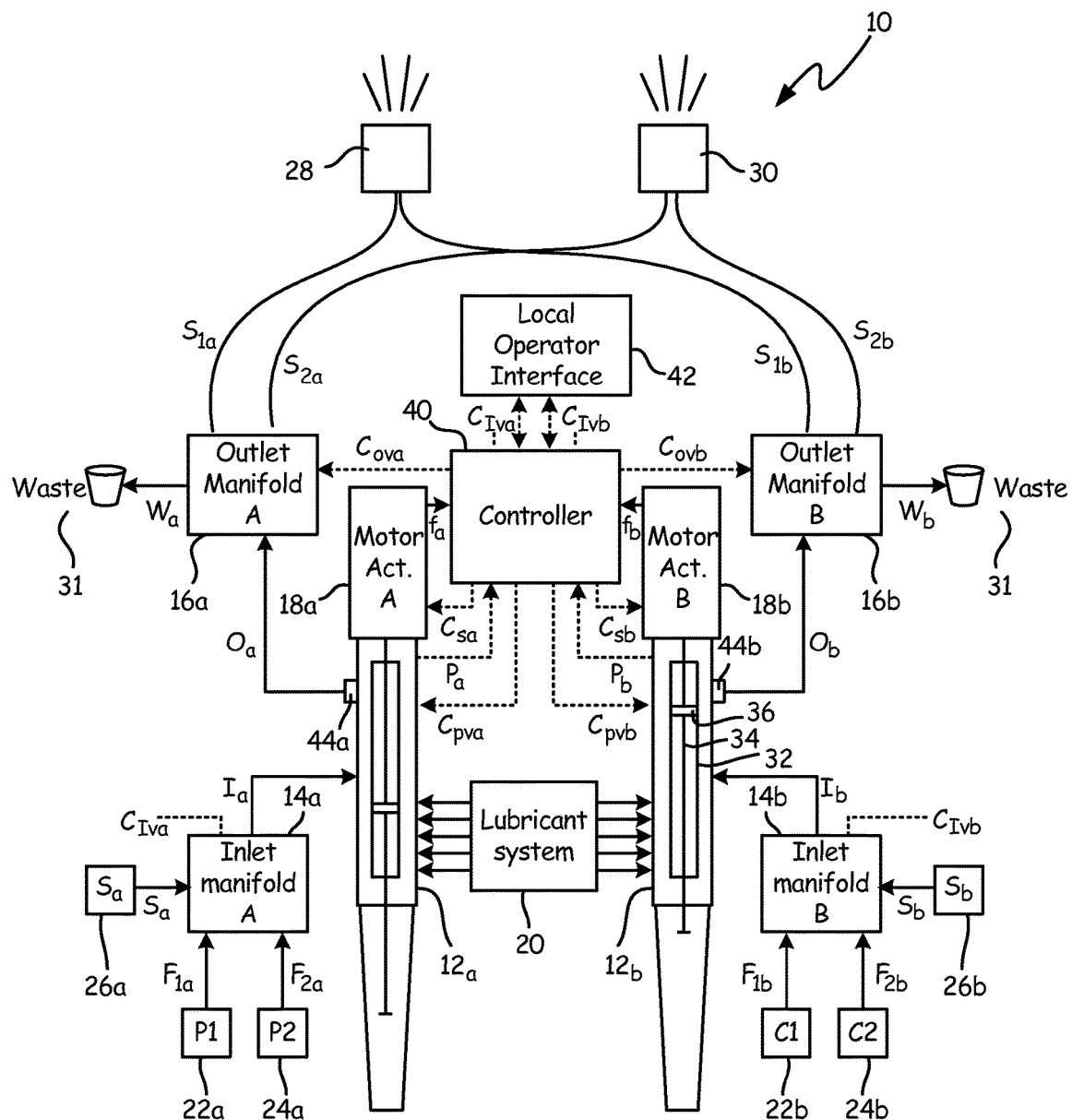
FIG. 1 is a schematic view of a spray system.

FIG. 1 is a schematic diagram of spray system 10, a two-side spray system with an A-side and a B-side configured to carry separate fluid components that are only combined when sprayed. Spray system 10 can, for example, combine an A-side paint with a B-side catalyst (e.g. a polyurethane, acrylic, polyester, or epoxy) at the moment of spraying. Although spray system 10 will be discussed hereinafter primarily as a system for spraying paint, the present invention can analogously be applied to sprayers for foam, adhesive, and other materials. Many components of spray system 10 are present in parallel on both A- and B-sides of the system. For clarity, A-side components are labeled with an "a" subscript, while B-side components are labeled with a "b" subscript. Hereinafter, reference numbers without subscript will be used to refer generically to elements found in parallel on both A- and B-sides of spray system 10, and to single elements common to both sides, while particular A- or B-side counterparts will be denoted with "a" or "b" subscripts, as appropriate. "Pump 12a" and "pump 12b," for example, are specific elements of the A- and B-side subsystems of spray system, respectively. Description related to "pump 12" (without subscript) refers generically to pump.

Spray system 10 includes A- and B-side pumps 12 that pump fluid from inlet manifolds 14 via inlet lines $I_a$ and $I_b$ to outlet manifolds 16 via outlet lines $O_a$ and $O_b$. In the depicted embodiment, pumps 12 are double-action reciprocating cylinder pumps driven by motorized actuators 18, with seals lubricated by lubricant system 20. Motorized actuators 18 can, for example, be linear DC step motors. Lubricant system 20 includes at least one lubricant reservoir and fluid routing lines suited to carry lubricant from lubricant system 20 to valve seals and other throat seals of pumps 12. Although lubricant system 20 is illustrated as a unitary system, some embodiments of spray system 10 can use separate A- and B-side lubricant systems, e.g with different lubricants.

Inlet and outlet manifolds 14 and 16, respectively, are valved manifolds that selectively couple pumps 12 to a plurality of fluid sources and outputs. Inlet and outlet manifolds 14 and 16 allow spray system 10 to switch between a plurality of connected fluids without any need to disconnect or reconnect fluid lines. Although each outlet manifold 16 is depicted with three outlets and each inlet manifold 14 is depicted with three inlets, any number of inlets and outlets can be used. Under ordinary operating conditions, valving in manifolds 14 and 16 allows only one input or output line to be open at a time. In some embodiments, inlet and outlet manifolds 14 and 16 are controlled electronically, as discussed in greater detail below with respect to controller 40. In other embodiments, inlet and outlet manifolds 14 and 16 can be actuated manually. Some embodiments of spray system 10 can allow for both electronic and manual valve actuation of inlet and outlet manifolds 14 and 16.

In the depicted embodiment, inlet manifolds 14 selectively connect pumps 18 to primary fluid sources 22 and 24 via fluid lines $F_1$ and $F_2$, respectively, and to solvent sources 26 via solvent lines S. Primary fluid sources 22a and 24a can, for example, be first and second paints P1 and P2, while primary fluid sources 22b and 24b can, for example, be first and second catalyst fluids C1 and C2. Solvent sources 26a and 26b can draw upon a common reservoir of solvent material, or can use different solvent materials.

In the depicted embodiment, outlet manifolds 16 similarly selectively connect pumps 18 to sprayers 28 and 30 via spray lines $S_1$ and $S_2$, and to waste fluid dump 31 via waste lines W. Waste fluid dump 31 accepts waste paint, catalyst, and solvent flushed from spray system 10 (e.g. when switching from first paint P1 and first catalyst fluid C1 to second paint P2 and second catalyst fluid C2). Sprayers 28 and 30 each accept spray lines from both A-side and B-side outlet manifolds 16. Sprayer 28, for example, accepts spray line $S_{1a}$ from A-side outlet manifold $16_a$ and spray line $S_{1b}$ from B-side outlet manifold $16_b$. Although only two sprayers 28 and 30 are depicted in FIG. 1, any number of separate sprayers can be used. Each sprayer can be dedicated to a single spray fluid combination (e.g. of paint and catalyst), to avoid mixture or fouling of different fluids. Accordingly, embodiments with additional fluid sources advantageously include additional sprayers, as well. Alternatively, sprayers need not be devoted to particular fluid combinations, but can be used sequentially for multiple different fluid combinations, if washed between spray sessions with different fluids. Sprayers 28 and 30 can, for example, be user-triggered spray guns or machine-actuated automatic sprayers.

In some embodiments, primary fluid sources 22 and 24 and solvent sources 26 are pre-pressurized sources capable of supplying at least 50% of output pressure of pumps 18. Pre-pressurized sources alleviate pumping load on motorized actuators 18, such that pumps 12 need only supply less than 50% or less than 30% (per the previously stated case) of output pressure. Sources 22, 24, and 26 can include dedicated pumps for pre-pressurizing fluids.

In the depicted embodiment, pumps 12 are metered linear pumps with dosing cylinders 32 that carry displacement rods 34. Displacement rods 34 are driven by motorized actuators 18, and both situate and drive plungers 36. In some embodiments, dosing cylinders 32, displacements rods 34, and plungers 36 may be balanced in working surface area so as to receive equal pressure from pre-pressurized sources (e.g. 22, 24) on up- and down-strokes.

The motor speed of motorized actuators 18 is variable, and determines the displacement of pumps 12. Displacement rods 34 extend into rod reservoirs 38, which can in some embodiments be flooded with lubricant from lubricant system 20. Pumps 12 each have inlet and outlet valves that actuate between up- and down-strokes of displacement rods 34 to direct fluid above or below plungers 36.

Spray system 10 is controlled by controller 40. Controller 40 is a computing device such as a microprocessor or collection of microprocessors with associated memory and local operator interface 42. Local operator interface 42 is a user interface device with, e.g. a screen, keys, dials, and/or gauges. In some embodiments of the present invention, local operator interface 42 can be a wired or wireless connection for a user operated tablet or computer. In other embodiments, local operator interface 42 can be an integrated interface configured to accept direct user input and provide diagnostic and operational data directly to a user. Local operator interface 42 can, for example, enable a user to input target ratios of A- and B-side fluid flow for each combination of A- and B-side fluids, and target output pressure. Local operator interface 42 can also provide users with diagnostic information including but not limited to failure identifications (e.g. for clogging or leakage), spray statistics (e.g. fluid volume sprayed or remaining), and status indications (e.g. "cleaning," "spraying," or "offline"). In some embodiments, controller 40 may include a database of known or previous configurations (e.g. target ratios and/or pressures for particular materials), such that a user at local operator interface 42 need only select a configuration from several options.

Controller 40 controls motorized actuators 18 via motor speed control signals $c_s$ and controls pump valving of pumps 12 via pump valve control signals $c_{PV}$. Controller 40 synchronizes valve actuation of pumps 12 with pump changeover to minimize downtime as plungers 36 reaches the top or bottom of their travel distances within dosing cylinder 32. In some embodiments, controller 40 may also control valving of inlet manifolds 14 and outlet manifolds 16 via inlet valve control signals $c_{IV}$ and outlet valve control signals $c_{OV}$, respectively. Controller 40 receives sensed pressure values $P_a$ and $P_b$ from pressure sensors 44a and 44b, respectively.

Pumping system 10 provides substantially uniform and continuous spray pressure through pump changeovers at specified pressures and material ratios. Pumping system 10 enables clean and efficient pumping and fluid switching without risk of fluid contamination, and without need for lengthy downtimes or large volume use of washing solvents.

Figure 2:
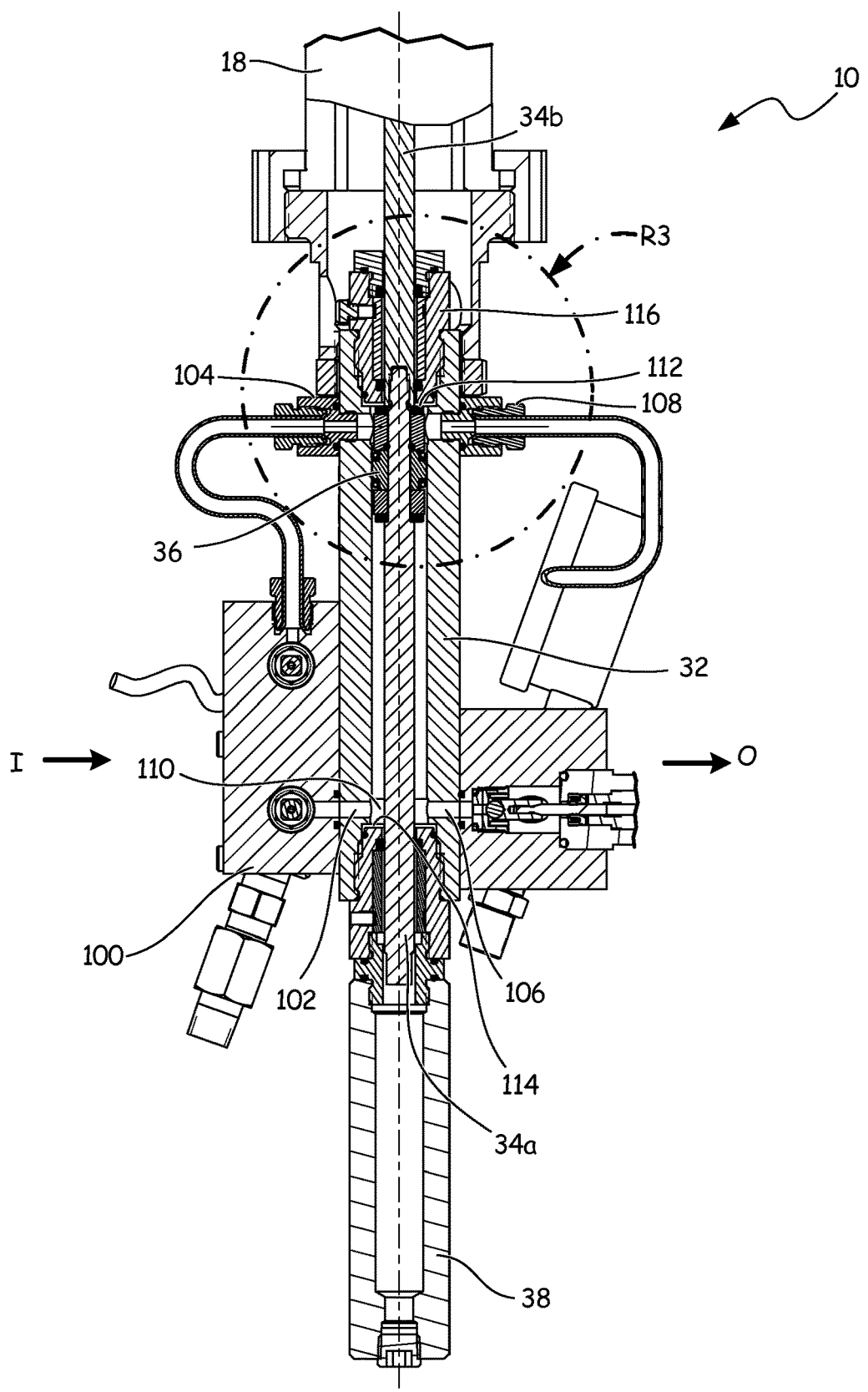
FIG. 2 is a cross-sectional view of a pump of the spray system of FIG. 1.

FIG. 2 is a cross-sectional view of a portion of spray system 10 near pump 12. FIG. 2 illustrates pump 12, motorized actuator 18, dosing cylinder 32, displacement rod 34 (as lower rod 34a and upper rod 34b), plunger 36, rod receptacle 38, pump body 100, inlet ports 102 and 104, outlet ports 106 and 108, lower cylinder end 110, upper cylinder end 112, and lower and upper displacement rod bearing assemblies 114 and 116, respectively. FIG. 2 also delineates region R3, which is discussed in greater detail with respect to FIG. 3.

As discussed above with respect to FIG. 1, pump 12 is a double-acting positive displacement pump with dosing cylinder 32, displacement rod 34, and plunger 36. In the depicted embodiment, displacement rod 34 is formed in two parts and consists of lower rod 34a, which extends through plunger 36 and downward towards rod receptacle 38, and upper rod 34b, which is secured to lower rod 34b and extends upwards into motorized actuator 18. Motorized actuator 18 reciprocates plunger 36 within cylinder 32 by driving upper rod 34b, and rod receptacle 38 receives lower rod 34a as plunger 36 travels away from motorized actuator 18. Lower and upper displacement rod bearing assemblies 114 and 116 support and guide lower and upper rods 34a and 34b, respectively. Lower and upper displacement rod bearing assemblies 114 and 116 also seal lower and upper bounds of cylinder 32, as defined by lower cylinder end 110 and upper cylinder end 112. Lower cylinder end 110 is the lowermost axial extent of the primary fluid working space contained within cylinder 32, while upper cylinder end 112 is the uppermost axial extent of that working space.

Pump body 100 is a solid structural member of pump 12 that supports cylinder 32 and contains fluid passages and valves that directing fluid from inlet line I to inlet ports 102 or 104 into cylinder 32, and from cylinder 32 through outlet ports 106 and 108 to outlet line O. Although typically only one each of inlet ports 102 and 104 and outlet ports 106 and 108 will receive fluid at any one time during ordinary pumping, some configurations of pump 12 may pass fluid through all four ports (e.g. for washing). Inlet port 102 is substantially aligned with outlet port 106 at a lower axial extent of cylinder 32 near lower cylinder end 110 and lower displacement rod bearing assembly 114. Inlet port 104 is substantially aligned with outlet port 108 at an upper axial extent of cylinder 32 near upper cylinder end 112 and upper displacement rod bearing rod assembly 116.

Pump 12 is balanced so as to receive equal up-stroke and down-stroke assist from a pre-pressurized fluid source such as fluid sources 22 or 24. In one embodiment 50% or more of the total output pressure of pump 12 is provided by a pre-pressurized source, with less than 50% of total output pressure coming from the operation of pump 12. In some embodiments, no more than 80% of the total output pressure of pump 12 is provided by a pre-pressurized source. Where a substantial fraction of the total output pressure of pump 12 comes from a pre-pressurized fluid source, the balance of pump 12 is essential. Pump 12 is balanced by substantially equalizing working surface area of plunger 36, such that the top surface area of plunger 36 facing upper cylinder end 112 substantially equals the lower bottom surface area of plunger 36 facing upper cylinder end 110. To this end, the reduction in effective top surface area of plunger 36 due to upper rod 34*b* is offset by lower rod 34*a*, which both serves as an additional guide for plunger 36 and assures that the displacement per travel distance of pump 12 is identical on up- and down-strokes. In some embodiments (particularly those expected to operate at relatively low pressures), the total working surface area of a lower face of plunger 36 may be slightly less than the total working surface area of its upper face, to account for gravity.

Figure 3:
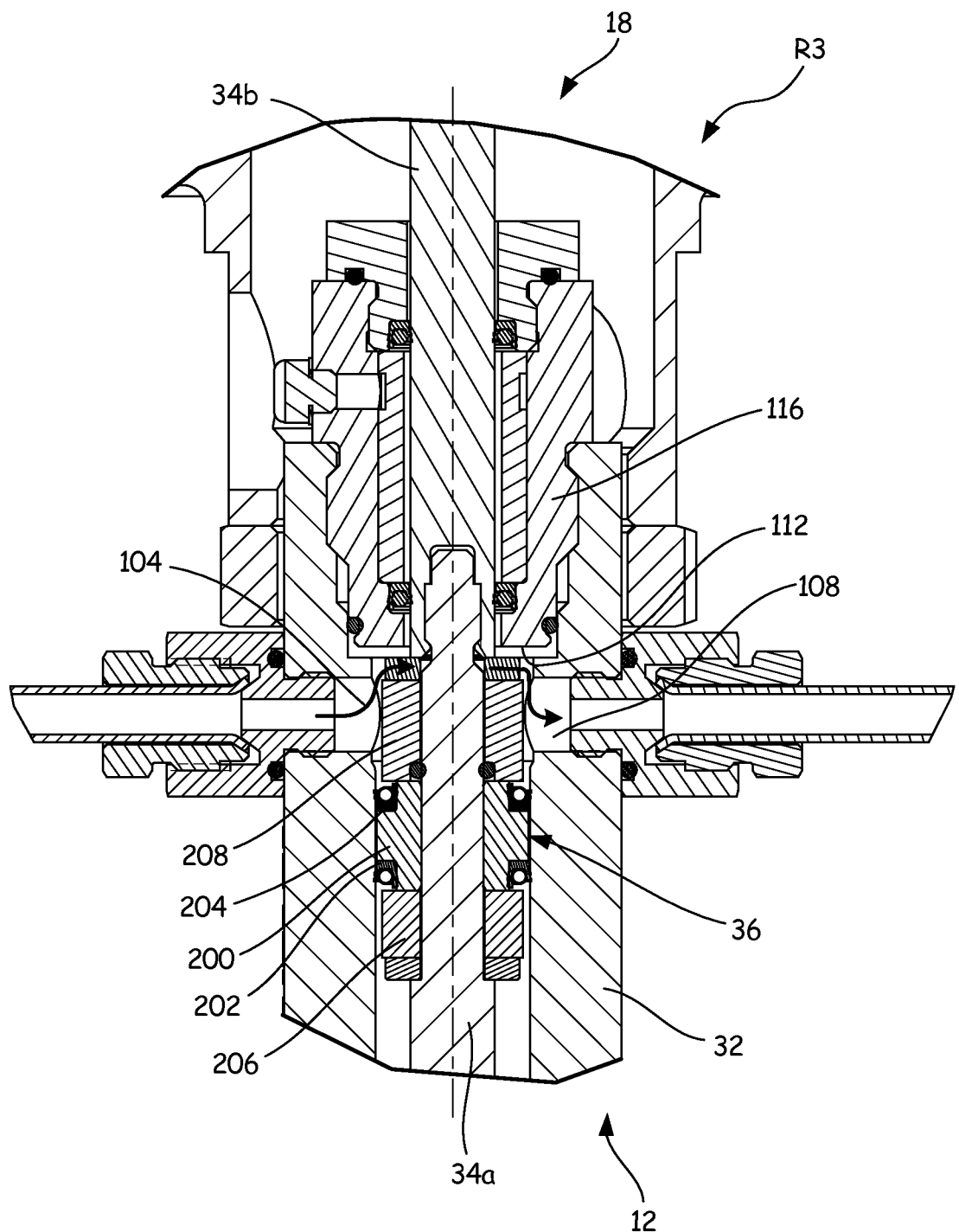
FIG. 3 is a close-up cross-sectional view of a plunger of the pump of FIG. 2.

FIG. 3 is a close-up cross-sectional view of region R3 of spray system 10, as shown in FIG. 2. FIG. 3 illustrates pump 12, motorized actuator 18, cylinder 32, displacement rod 34 (in the form of lower rod 34*a* and upper rod 34*b*), plunger 36, inlet port 104, outlet port 108, upper cylinder end 112, and upper displacement rod bearing assembly 116, as described above with respect to FIG. 2. FIG. 3 further illustrates bearing 200, lower cup seal 202, upper cup seal 204, lower spacer 206, and upper spacer 208 of plunger 36. Bearing 200 is anchored to displacement rod 34, and carries cup seals 202 and 204. Lower and upper cup seal 202 and 204 are downward- and upward-facing annular fluid seals, respectively, that together prevent fluid from flowing past plunger 36. Lower and upper spacers 206 and 208 are annular blocking features that reduce the flow area separating inlet and outlet ports 104 and 108 when plunger 36 is at lower cylinder end 110 and upper cylinder end 112, respectively. Lower spacer 206 substantially occludes the flow volume of cylinder 32 between inlet port 102 and outlet port 106 when plunger 36 is at a bottom-most position within cylinder 32, without fully blocking fluid flow. Similarly, upper spacer 208 substantially occludes the flow area of cylinder 32 between inlet port 104 and outlet port 108 when plunger 36 is at a top-most position within cylinder 32, without fully blocking fluid flow. In one embodiment, spacers 206 and 208 provide a minimum flow path clearance of at least 0.05 inches (1.27 mm) to allow fluid flow between plunger 36 and lower cylinder end 110 and upper cylinder end 112, respectively. Depending on the position of ports 102, 104, 106, and 108 relative to upper and lower cylinder ends 110 and 112, spacers 206 and 208 may differ in length. In the illustrated embodiment, ports 102 and 106 are closer to lower cylinder end 110 than ports 104 and 106, and spacer 206 is accordingly axially shorter than spacer 208.

Spacers 206 and 208 of plunger 36 minimize total flow volume between inlet and outlet ports of pump 12 while plunger 36 is at its outermost axial positions. This reduces the volume of primary fluid left in a non-working space of cylinder 32 during pump changeover. The reduced volume of paint left in cylinder 32 during changeover also makes washing cylinder 32 (e.g. in preparation for changing fluids) faster, and the reduced non-working space allows less cleaning fluid to be consumed during wash cycles.

Discussion of Possible Embodiments

The following are non-exclusive descriptions of possible embodiments of the present invention.

A spray system comprises: a pre-pressurized fluid source supplying pre-pressurized spray fluid; a proportioning cylinder; a valved inlet line that fluidly connects the pre-pressurized source to a first axial extent of proportioning cylinder in a first state of the spray system, and to a second axial extent of the proportioning cylinder opposite the first in a second state of the spray system; a sprayer fluidly connected to the proportioning cylinder via a valved outlet line; and a double-action reciprocating plunger situated within the proportioning cylinder with a first axial surface facing the first axial extent of the proportioning cylinder, and a second axial surface facing the second axial extent of the proportioning cylinder, wherein the first and second axial surface have equal working surface are.

The spray system of the preceding paragraph can optionally include, additionally and/or alternatively, any one or more of the following features, configurations and/or additional components:

A further embodiment of the foregoing spray system, wherein the double-action reciprocating plunger is anchored to a displacement rod that extends the full axial length of the proportioning cylinder regardless of the position of the double-action reciprocating plunger within the proportioning cylinder.

A further embodiment of the foregoing spray system, wherein the displacement rod comprises a first section extending from the first axial surface of the double-action reciprocating plunger through a bearing seal at the first axial extent of the proportioning cylinder to engage a motor, and a second section extending from the second axial surface of the double-action reciprocating plunger through a bearing seal at the second axial extent of the proportioning cylinder, into a rod reservoir.

A further embodiment of the foregoing spray system, wherein the pre-pressurized source accounts for at least 50% of an output pressure of the spray fluid at the sprayer.

A further embodiment of the foregoing spray system, wherein the pre-pressurized source accounts for at least 70% of an output pressure of the spray fluid at the sprayer.

A further embodiment of the foregoing spray system, wherein the first axial surface is formed by a first cup seal and a first spacer, and the second axial surface is formed by a second cup seal and a second spacer.

A further embodiment of the foregoing spray system, wherein the first and second spacers have unequal axial height.

A further embodiment of the foregoing spray system, wherein the first and second cup seals are separated by a bearing.

A pumping system comprises: a proportioning cylinder oriented along a proportioning cylinder axis; a first inlet into the proportioning cylinder and a first outlet from the proportioning cylinder, each situated at near first axial extent of the proportioning cylinder; a second inlet into the proportioning cylinder and a second outlet from the proportioning cylinder, each situated near a second axial extent of the proportioning cylinder opposite the first axial extent of the proportioning cylinder; a displacement rod extending along the proportioning cylinder axis, and driven in a reciprocating fashion by a linear motor; a plunger affixed to the displacement rod and filling a circumferential area of the proportioning cylinder, the plunger comprising first and second seals and spacers facing the first and second axial extents of the proportioning cylinder, respectively; wherein, in an uppermost position of the displacement rod, the first spacer extends between and axially past the first inlet and outlet towards the first axial extent of the proportioning cylinder, without fully obstructing flow between the first inlet and the first outlet; and wherein, in a lowermost position of the displacement rod, the second spacer extends between and axially past the second inlet and outlet towards the second axial extent of the proportioning cylinder, without fully obstructing flow between the second inlet and the second outlet.

The pumping system of the preceding paragraph can optionally include, additionally and/or alternatively, any one or more of the following features, configurations and/or additional components:

A further embodiment of the foregoing pumping system, wherein the first spacer extends axially towards the first axial extent of the proportioning cylinder, from the first seal, and the second spacer extends axially towards the second axial extent of the proportioning cylinder, from the second seal.

A further embodiment of the foregoing pumping system, wherein the first and second seals are cup seals facing the first and second axial extends of the proportioning cylinder, respectively.

A further embodiment of the foregoing pumping system, wherein the cup seals are separated by a bearing.

A further embodiment of the foregoing pumping system, wherein the first and second spacers have unequal axial height.

A further embodiment of the foregoing pumping system, wherein the first and second spacers provide a minimum flow path clearance of at least 0.05 inches (1.27 mm) between the plunger and the first and second axial extends of the cylinder.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pumping system comprising:
   a proportioning cylinder oriented along a proportioning cylinder axis;
   a first inlet extending into the proportioning cylinder and a first outlet from the proportioning cylinder, each situated at a first axial extent of the proportioning cylinder;
   a second inlet extending into the proportioning cylinder and a second outlet from the proportioning cylinder, each situated at a second axial extent of the proportioning cylinder opposite the first axial extent of the proportioning cylinder;
   a displacement rod extending along the proportioning cylinder axis, wherein the displacement rod is driven in a reciprocating fashion by a linear motor;
   a plunger affixed to the displacement rod and filling a circumferential area of the proportioning cylinder, the plunger comprising first and second seals and a first spacer and a second spacer facing the first and second axial extents of the proportioning cylinder, respectively, wherein the first spacer extends between and axially past the first inlet and first outlet towards the first axial extent of the proportioning cylinder without fully obstructing flow between the first inlet and the first outlet at an uppermost position of the displacement rod, and wherein the second spacer extends between and axially past the second inlet and second outlet towards the second axial extent of the proportioning cylinder without fully obstructing flow between the second inlet and the second outlet in a lowermost position of the displacement rod;
   wherein in the uppermost position of the displacement rod, the first spacer abuts the first axial extent of the proportioning cylinder and extends axially therefrom past the first inlet and first outlet, such that the plunger is displaced axially downward from the first inlet and first outlet; and
   wherein in the lowermost position of the displacement rod, the second spacer abuts the second axial extent of the proportioning cylinder and extends axially therefrom past the second inlet and second outlet, such that the plunger is displaced axially upward from the second inlet and second outlet.

2. The pumping system of claim 1, wherein the first spacer extends axially from the first seal towards the first axial extent of the proportioning cylinder, and wherein the second spacer extends axially from the second seal towards the second axial extent of the proportioning cylinder.

3. The pumping system of claim 2, wherein the first and second seals are cup seals facing the first and second axial extents of the proportioning cylinder, respectively.

4. The pumping system of claim 3, wherein the cup seals are separated by a bearing.

5. The pumping system of claim 1, wherein the first and second spacers have unequal axial height.

6. The pumping system of claim 1, wherein the first and second spacers provide a flow path clearance of at least 0.05 inches (1.27 mm) between the plunger and the first and second axial extents of the cylinder.

7. A spray system comprising:
   a pre-pressurized fluid source supplying pre-pressurized spray fluid;
   the pumping system of claim 1;
   a valved inlet line that fluidly connects the pre-pressurized source to the first inlet in a first state of the spray system, and to the second inlet in a second state of the spray system; and
   a sprayer fluidly connected to the proportioning cylinder via a valved outlet line.

8. The spray system of claim 7, wherein the pre-pressurized source accounts for at least 50% of an output pressure of the spray fluid at the sprayer.

9. The spray system of claim 8, wherein the pre-pressurized source accounts for no more than 80% of an output pressure of the spray fluid at the sprayer.

10. The pumping system of claim 1, wherein the displacement rod comprises a first section extending from a first axial surface of the plunger through a bearing seal at the first axial extent of the proportioning cylinder to engage a motor, and a second section extending from a second axial surface of the plunger through a bearing seal at the second axial extent of the proportioning cylinder and into a rod reservoir.

* * * * *